United States Patent
Cao et al.

(10) Patent No.: US 6,778,780 B1
(45) Date of Patent: *Aug. 17, 2004

(54) WDM UTILIZING GRATING-BASED CHANNEL SEPARATORS

(75) Inventors: Simon X. F. Cao, Pleasanton, CA (US); Olga Gorbounova, Santa Clara, CA (US); Kenneth John Bystrom, Tracy, CA (US); Hubert Joachim Vollmer, Tracy, CA (US)

(73) Assignee: Avanex Corporation, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/579,209

(22) Filed: May 25, 2000

(51) Int. Cl.[7] .............................................. H04J 14/02
(52) U.S. Cl. ............................ 398/84; 398/68; 398/82; 398/87; 398/88; 398/95
(58) Field of Search ................................. 359/124, 127, 359/130, 131, 181, 566, 569, 570, 572; 398/68, 82, 84, 87, 88, 95

(56) References Cited

U.S. PATENT DOCUMENTS

| | | | | |
|---|---|---|---|---|
| 6,181,849 B1 | * | 1/2001 | Lin et al. | 385/24 |
| 6,256,433 B1 | * | 7/2001 | Luo et al. | 385/24 |
| 6,295,149 B1 | * | 9/2001 | Meli | 398/9 |
| 6,310,993 B1 | * | 10/2001 | Cao et al. | 385/24 |
| 6,377,728 B1 | * | 4/2002 | Vollmer et al. | 385/37 |
| 6,388,783 B1 | * | 5/2002 | Weller-Brophy | 398/82 |
| 6,459,831 B1 | * | 10/2002 | Cao et al. | 385/24 |
| 6,486,988 B1 | * | 11/2002 | Lewis et al. | 398/83 |

* cited by examiner

Primary Examiner—Leslie Pascal
Assistant Examiner—Dzung Tran
(74) Attorney, Agent, or Firm—Moser Patterson & Sheridan LLP

(57) ABSTRACT

The present invention provides an improved wavelength division multiplexer (WDM) which utilizes a grating-based channel separator. The WDM includes an interleaved channel separator; and at least one channel separator optically coupled to the interleaved channel separator. The channel separator includes a grating. In a preferred embodiment, the channel separator also includes an alignment surface of the grating, a sleeve comprising a mount, the mount capable of contacting the grating, and an alignment plate coupled to an outer surface of the sleeve, wherein the alignment plate is capable of contacting the alignment surface of the grating. This grating-based channel separator affords a quick, easy, precise and reproducible positioning and alignment of grating block. Thus, the WDM is minimized in size while also reproducibly assembled with perfect alignment in a minimal amount of time.

24 Claims, 16 Drawing Sheets

WDM UTILIZING GRATING-BASED CHANNEL SEPARATORS

FIELD OF THE INVENTION

The present invention relates to diffraction gratings in optical communications networks and systems, and more particularly to wavelength division multiplexers utilizing diffraction gratings.

BACKGROUND OF THE INVENTION

Fiber optic communication systems are becoming increasingly popular for data transmission due to their high speed and high data capacity capabilities. Wavelength division multiplexing is used in such fiber optic communication systems to transfer a relatively large amount of data at a high speed. In wavelength division multiplexing, multiple information-carrying signals, each signal comprising light of a specific restricted wavelength range, may be transmitted along the same optical fiber.

In this document, these individual information-carrying lights are referred to as either "signals" or "channels." The totality of multiple combined signals in a wavelength-division multiplexed optical fiber, optical line or optical system, wherein each signal is of a different wavelength range, is herein referred to as a "composite optical signal."

The term "wavelength," denoted by the Greek letter $\lambda$ (lambda) is used herein in two senses. In the first usage, this term is used according to its common meaning to refer to the actual physical length comprising one full period of electromagnetic oscillation of a light ray or light beam. In its second usage, the term "wavelength" is used synonymously with the terms "signal" or "channel." Although each information-carrying channel actually comprises light of a certain range of physical wavelengths, for simplicity, a single channel is referred to as a single wavelength, $\lambda$, and a plurality of n such channels are referred to as "n wavelengths" denoted $\lambda_1$–$\lambda_n$. Used in this sense, the term "wavelength" may be understood to refer to "the channel nominally comprised of light of a range of physical wavelengths centered at the particular wavelength, $\lambda$."

A crucial feature of fiber optic networks is the separation of the composite optical signal into its component wavelengths or channels, typically by a wavelength division multiplexer. This separation must occur to allow for the exchange of signals between loops within optical communications networks. The exchange typically occurs at connector points, or points where two or more loops intersect for the purpose of exchanging wavelengths.

FIG. 1a schematically illustrates one form of an add/drop system, which typically exists at connector points for the management of the channel exchanges. The exchanging of data signals involves the exchanging of matching wavelengths from two different loops within an optical network. In other words, each composite optical signal drops a channel to the other loop while simultaneously adding the matching channel from the other loop.

A wavelength division multiplexer (WDM) typically performs separation of a composite optical signal into component channels in an add/drop system. Used in its reverse sense, the same WDM can combine different channels, of different wavelengths, into a single composite optical signal. In the first instance, this WDM is strictly utilized as a de-multiplexer and, in the second instance, it is utilized as a multiplexer. However, the term "multiplexer" is typically used to refer to such an apparatus, regardless of the "direction" in which it is utilized.

FIG. 1a illustrates add/drop systems 218 and 219 utilizing wavelength division multiplexers 220 and 230. A composite optical signal from Loop 110 ($\lambda_1$–$\lambda_n$) enters its add/drop system 218-at node A (240). The composite optical signal is separated into its component channels by the WDM 220. Each channel is then outputted to its own path 250-1 through 250-n. For example, $\lambda_1$ would travel along path 250-1, $\lambda_2$ would travel along path 250-2, etc. In the same manner, the composite optical signal from Loop 150 ($\lambda_1'$–$\lambda_n'$) enters its add/drop system 219 via node C (270). The signal is separated into its component channels by the WDM 230. Each channel is then outputted via its own path 280-1 through 280-n. For example, $\lambda_1'$ would travel along path 280-1, $\lambda_2'$ would travel along path 280-2, etc.

In the performance of an add/drop function, for example, $\lambda_1$ is transferred from path 250-1 to path 280-1. It is combined with the others of Loop 150's channels into a single new composite optical signal by the WDM 230. The new signal is then returned to Loop 150 via node D 290. At the same time, $\lambda_1'$ is transferred from path-280-1 to path 250-1. It is combined with the others of Loop 110's channels into a single new composite optical signal by the WDM 220. This new signal is then returned to Loop 110 via node B (260). In this manner, from Loop 110's frame of reference, channel $\lambda_1$ of its own signal is dropped to Loop 150 while channel $\lambda_1'$ of the signal from Loop 150 is added to form part of its new signal. This is the add/drop function.

FIG. 1b illustrates a second form by which add/drop systems 218 and 219 may be configured. In FIG. 1b, each WDM is optically coupled to a first plurality of paths through which channels are outputted and to a second plurality of paths through which signals are inputted. For instance, the paths 250-1, 250-2, . . . , 250-n are utilized to output signals comprising wavelengths $\lambda_1$, $\lambda_2$, . . . , $\lambda_n$, respectively, from the WDM 220 and the paths 251-1, 251-2, . . . , 251-n are utilized to input signals comprising such wavelengths to the WDM 220. Likewise, as shown in FIG. 1b, the paths 280-1, 280-2, . . . , 280-n are utilized to output signals $\lambda_1'$, $\lambda_2'$, . . . , $\lambda_n'$ (comprising the physical wavelengths $\lambda_1$, $\lambda_2$, . . . , $\lambda_n$) respectively, from the WDM 230 and the paths 281-1, 281-2, . . . , 281-n are utilized to input signals comprising such wavelengths to the WDM 230.

A "channel separator" or, simply, "separator," as the term is used in this specification, is an integrated collection of optical components functioning as a unit, which separates one or more channels of a composite optical signal from one another. One example of a channel separator is disclosed in U.S. Pat. No. 6,130,971, assigned to the assignee of the present application. This U.S. Patent is incorporated herein by reference. The channel separator disclosed in the above-referenced U.S. Patent permits fabrication of dense wavelength division multiplexers (DWDM's) having greater ease in alignment and higher tolerance to drift due to increased width of the pass bands and having greater passive stability against temperature variations. If a composite optical signal comprises more than two channels, then more than one stage of separation may be required to effect full or complete separation of each channel from every other channel. An efficient method of full or complete channel separation is disclosed in another U.S. Pat. No. 6,263,126, assigned to the assignee of the present application. This U.S. Patent is incorporated herein by reference.

A schematic illustration of the Multi-Stage Parallel Cascade Method is illustrated in FIG. 1c. In FIG. 1c, a composite optical signal comprising channels $\lambda_1$–$\lambda_n$ enters the DWDM 100 through port A (240). The signal passes through a first interleaved channel separator 112a which divides the composite optical signal into two separate signal subsets, one containing the odd channels ($\lambda_1$, $\lambda_3$, $\lambda_5$, ...) (130) and the other containing the even channels ($\lambda_2$, $\lambda_4$, $\lambda_6$, ...) (140). These odd and even channels are each passed through another interleaved channel separator 112b–112c which further divides them by every other channel. This division continues until only one channel is outputted to each output optical fiber 160-1 through 160-n.

For de-multiplexing of dense wavelength division multiplexed composite optical signals, it is preferable that the initial stages of channel separation in the Multi-Stage Parallel Cascade method are performed by channel separators of the type disclosed in U.S. patent application Ser. No. 09/129,635 because of the advantages of increased pass band widths and greater passive temperature stability. However, in later stages of channel separation, different, less-sophisticated secondary separators may be employed so as to reduce overall system complexity and fabrication costs.

Such secondary channel separators could comprise diffraction gratings. FIGS. 2a and 2b illustrate a top view and side view, respectively, of a prior-art grating-based channel separator. In the separator 200, a concave reflection-type holographic grating 202 is disposed upon a substrate plate or block 201 comprised of a material with low thermal expansion. The grating 202, which comprises a portion of a spherical surface 206 centered at point 210, receives a wavelength-division multiplexed composite optical signal 211 input to the separator 200 from an input fiber 204. The composite optical signal 211 is comprised of a plurality of individual channels, $\lambda_1$, $\lambda_2$, .... The concave grating 202 diffracts, reflects, focuses and spatially disperses each of these individual channels according to its respective wavelength such that each channel is directed to exactly one of a plurality of output fibers 209a–209b. For instance, referring to FIG. 2a, if input signal 201 is comprised of two channels, namely channel $\lambda_1$ (207a) and channel $\lambda_2$ (207b), with $\lambda_1 < \lambda_2$, then, upon back-diffraction from grating 202, the $\lambda_1$ channel (207a) and the $\lambda_2$ channel (207b) are focused onto the end of fiber 209a and fiber 209b, respectively.

The input fiber 204 and the plurality of output fibers 209a–209c are disposed within an array 205 of fibers. The end faces of the fibers in array 205 are disposed along or parallel to a plane 208 which makes an angle of 60° with the line 203 that is normal to the grating 202 at the center of the grating 202. With this disposition, the grating 202 diffracts light according to the Littrow configuration, in which the angles of incidence and diffraction are approximately equal. FIG. 2b shows a side view of the prior art apparatus taken parallel to the fiber 204. FIG. 2b shows that the fibers are directed towards the grating vertex and are at an angle to the grating dispersion plane 215. The input fiber 204 and the output fibers 209a–209c each make the same angle $\phi$ (taken without regard to algebraic sign) with respect to the dispersion plane 215 and the input fiber 204 makes an angle of $2\phi$ with respect to the plane of the output fibers. With channels spaced at 0.33 nm, fiber-to-fiber losses within the separator 200 can be maintained at less than 1 dB and ultra-low crosstalk can be maintained.

For use in commercial optical communications systems, the separator's packaging must be configured such that the size of the WDM is minimized while also such that the WDM can be reproducibly assembled with perfect alignment in a minimal amount of time. Furthermore, the WDM must be packaged or mounted in such a fashion that there is minimal temperature sensitivity. These conditions are problematic since, not only must the grating be positioned precisely with respect to the input and output optical fibers, but also must the angle of the fibers relative to the grating surface and the rotation of the grating surface about its optical axis be precisely and accurately controlled. Slight mis-alignment of the grating and the fibers or of the tilt or rotation of the grating can lead to severe insertion loss and cross talk penalties.

Accordingly, there exists a need for an improved wavelength division multiplexer (WDM) utilizing a grating-based channel separator. The grating-based channel separator should comprise a packaging which affords, easy, precise, and reproducible positioning and alignment of its diffraction grating. The present invention addresses such a need.

SUMMARY OF THE INVENTION

The present invention provides an improved wavelength division multiplexer (WDM) which utilizes a grating-based channel separator. The WDM includes an interleaved channel separator; and at least one channel separator optically coupled to the interleaved channel separator. The channel separator includes a grating. In a preferred embodiment, the channel separator also includes an alignment surface of the grating, a sleeve comprising a mount, the mount capable of contacting the grating, and an alignment plate coupled to an outer surface of the sleeve, wherein the alignment plate is capable of contacting the alignment surface of the grating. This grating-based channel separator affords a quick, easy, precise and reproducible positioning and alignment of grating block. Thus, the WDM is minimized in size while also reproducibly assembled with perfect alignment in a minimal amount of time.

DETAILED DESCRIPTION

The present invention provides an improved wavelength division multiplexer (WDM) utilizing a grating-based channel separator. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

A preferred embodiment of a WDM in accordance with the present invention comprises an interleaved channel separator and one or more grating-based channel separator. Each of the grating-based channel separators comprises a concave holographic reflection grating with an alignment surface, a first hollow sleeve or cylinder with a mount for contacting the concave holographic reflecting grating and alignment surface, a pin or plate to align the alignment surfaces of the grating and the first hollow sleeve or cylinder, and a second hollow sleeve or cylinder with a spring-loaded holding mechanism in contact with the back side of the grating substrate.

To more particularly describe the features of the present invention, please refer to FIGS. 3 through 10 in conjunction with the discussion below.

FIGS. 3 through 7e illustrate a preferred embodiment of a grating-based channel separator used in the WDM in accordance with the present invention. This grating-based channel separator is disclosed in U.S. Pat. No. 6,377,728, assigned to the assignee of the present application. Applicants hereby incorporate this patent application by reference.

Figure 3:
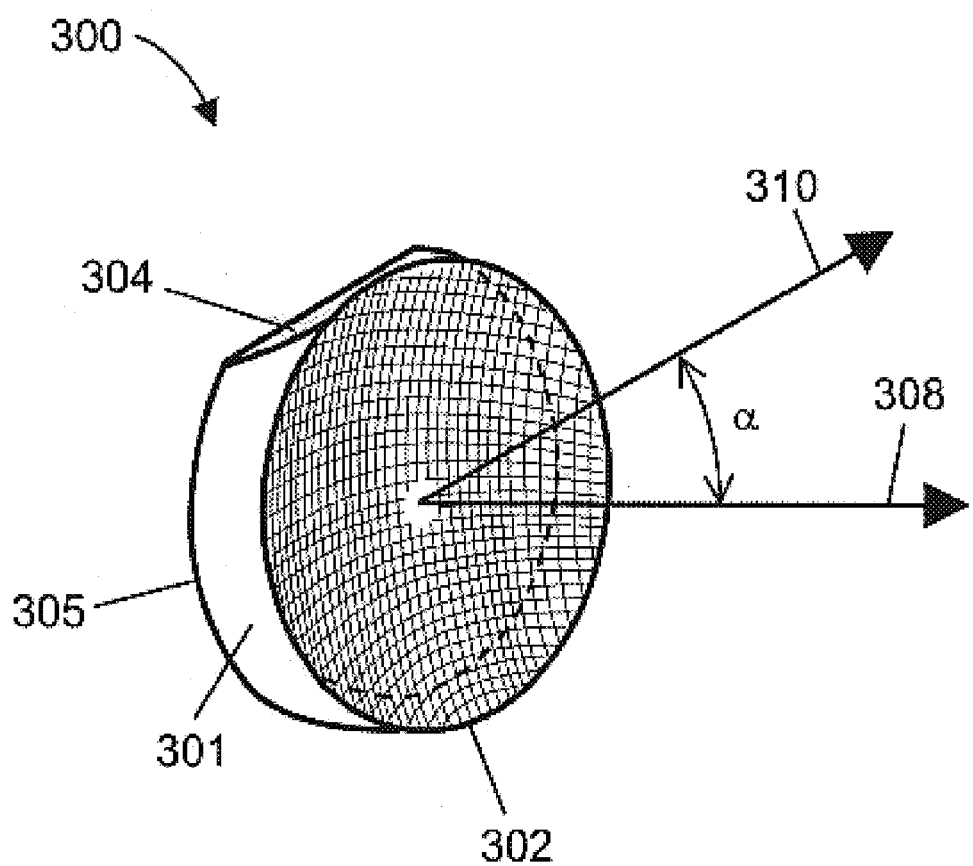
FIG. 3 illustrates, in perspective view, a concave holographic grating block of a channel separator of a WDM in accordance with the present invention.

FIG. 3 illustrates, in perspective view, a concave holographic grating block of a channel separator of the WDM in accordance with the present invention. The grating block 300 comprises a diffraction grating 302 disposed on the concave surface of a substrate plate 301. The grating 302 comprises a reflective concave surface or film in the geometric form of a spherical cap. The grating axis 308 is perpendicular to the chord to spherical cap grating surface 302 at the center of this surface. The back surface 305 of substrate plate 301 is opposite to the grating surface 302. An alignment surface 304 is formed or cut within substrate plate 301 at an oblique angle with respect to the grating surface 302.

A plurality of holographically formed grooves or Bragg diffraction surfaces is disposed upon or within the grating 302. The grooves or Bragg surfaces comprise the light scattering elements of grating 302 and represent an interference fringe pattern produced using the well-known technique of holography. The grooves or Bragg surfaces of grating 302 are disposed such that the grating 302 operates in the Littrow configuration—that is, such that light rays delivered to the grating 302 and light rays diffracted from the grating 302 are substantially parallel to a single axis 310 disposed at a particular angle α to the grating axis.

Figure 4:
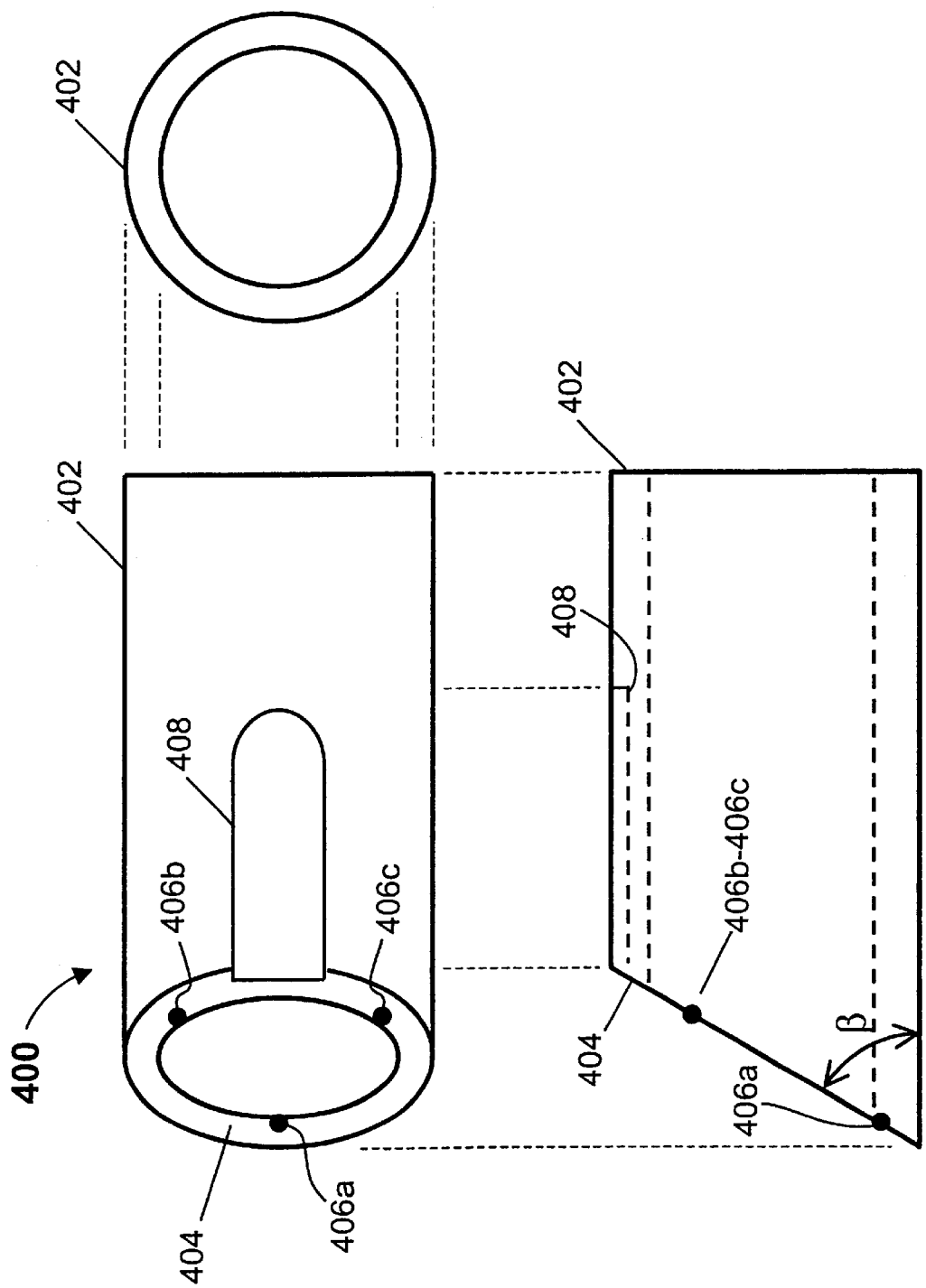
FIG. 4 illustrates a grating mounting block utilized in conjunction with the concave holographic grating of the channel separator of the WDM in accordance with the present invention.

FIG. 4 illustrates a grating mounting block utilized in conjunction with the concave holographic grating of the channel separator of the WDM in accordance with the present invention. The mounting block 400 comprises a hollow rod 402. A slanted surface 404 is cut or formed at one end of rod 402 and carries a plurality of rounded mounting pins or mounting balls 406a–406c. In the preferred embodiment, three mounting pins are used. The slant angle β that the surface 404 makes with the axis of the rod 402 is substantially equal to the complement of the angle of incidence of input signal light rays delivered to the grating 302 in Littrow configuration. Further, a groove or slot 408 is cut or formed on the outer side surface of hollow rod 402.

Figure 5:
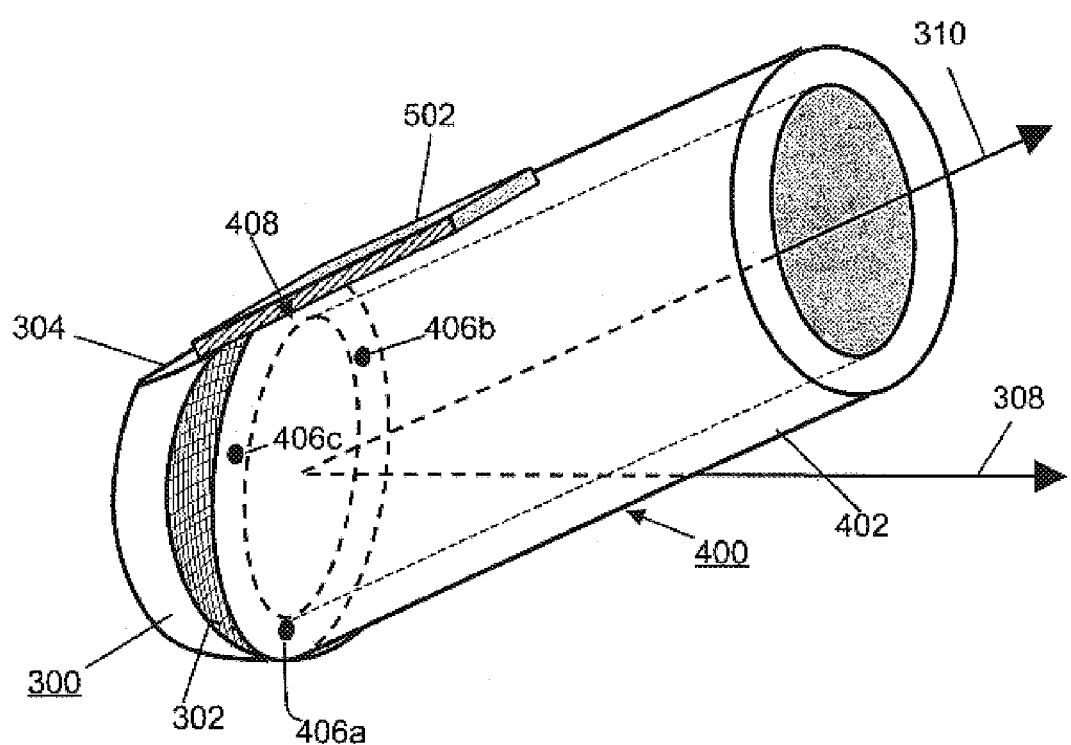
FIG. 5 illustrates a perspective view of a concave holographic grating disposed adjacent to a grating mounting block of the channel separator of the WDM in accordance with the present invention.

FIG. 5 illustrates a perspective view of a concave holographic grating disposed adjacent to a grating mounting block of the channel separator of the WDM in accordance with the present invention. The three rounded mounting pins 406a–406c comprise the sole contact points between the grating surface 302 and the mounting block 400. A rotational alignment pin or plate 502 is disposed so as to contact both the alignment surface 304 of grating block 300 and the slot 408 of hollow rod 402. The rotational alignment pin or plate 502 locks the rotational alignment of grating surface 302 such that the Littrow axis 310 is substantially parallel to the long axis of hollow rod 402. The alignment plate 502 is secured to rod 402 by adhesive, epoxy, solder, or the like.

Figure 6:
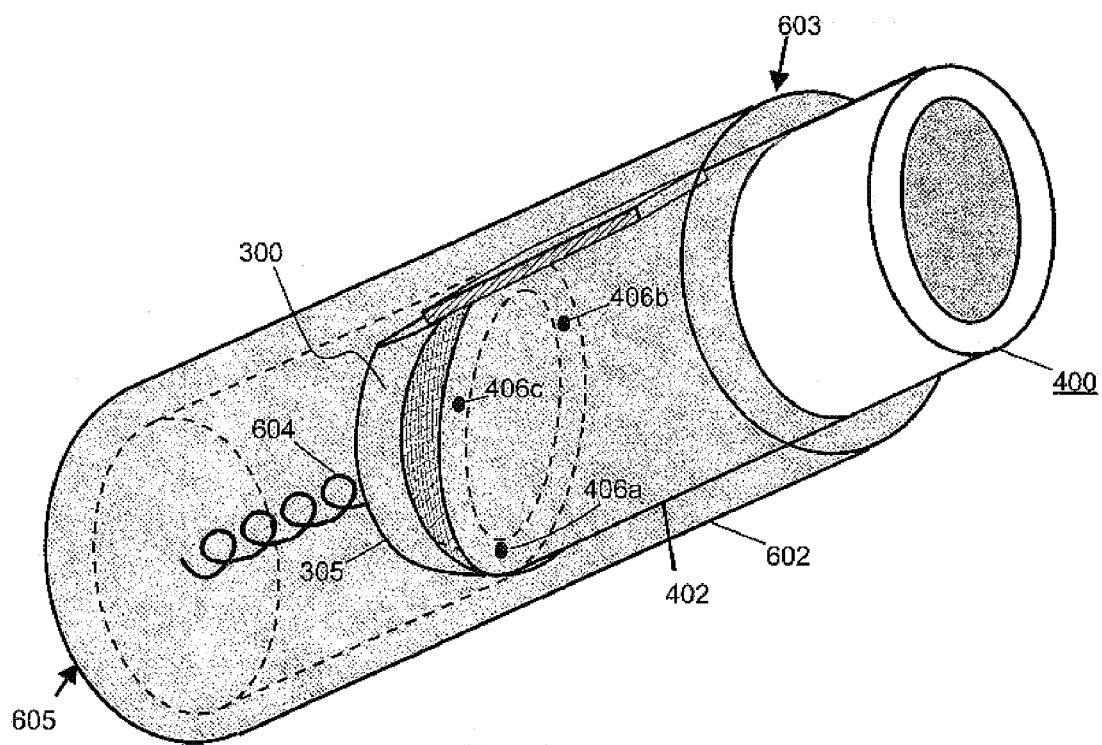
FIG. 6 illustrates further details of the assembly and alignment of the grating block of the channel separator of the WDM in accordance with the present invention.

FIG. 6 illustrates further details of the assembly and alignment of the grating block within the channel separator of the WDM in accordance with the present invention. The grating block 300 is housed within an outer protective tube or sleeve 602. The sleeve 602 is open only at its front end 603 and is sealed at its back end 605. The inner diameter of the sleeve 602 is large enough to fit over at least a portion of the hollow rod 402. A holding mechanism 604 housed within the sleeve 602 applies force to the back face 305 of grating block 300. In the preferred embodiment, the holding mechanism 604 is spring-loaded. This force is such that, when sleeve 602 is fitted over rod 402, the spring mechanism 604 forces the grating block 300 into its proper alignment against the pins 406a–406c and the alignment plate 502.

Figure 7A:
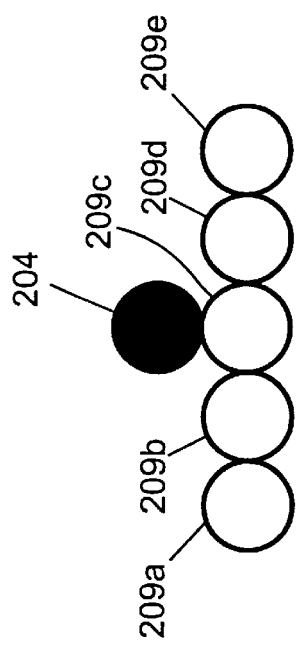
FIGS. 7a and 7b illustrate end views of input and output fibers in two possible configurations of a fiber array of the channel separator of the WDM in accordance with the present invention.
Figure 7B:
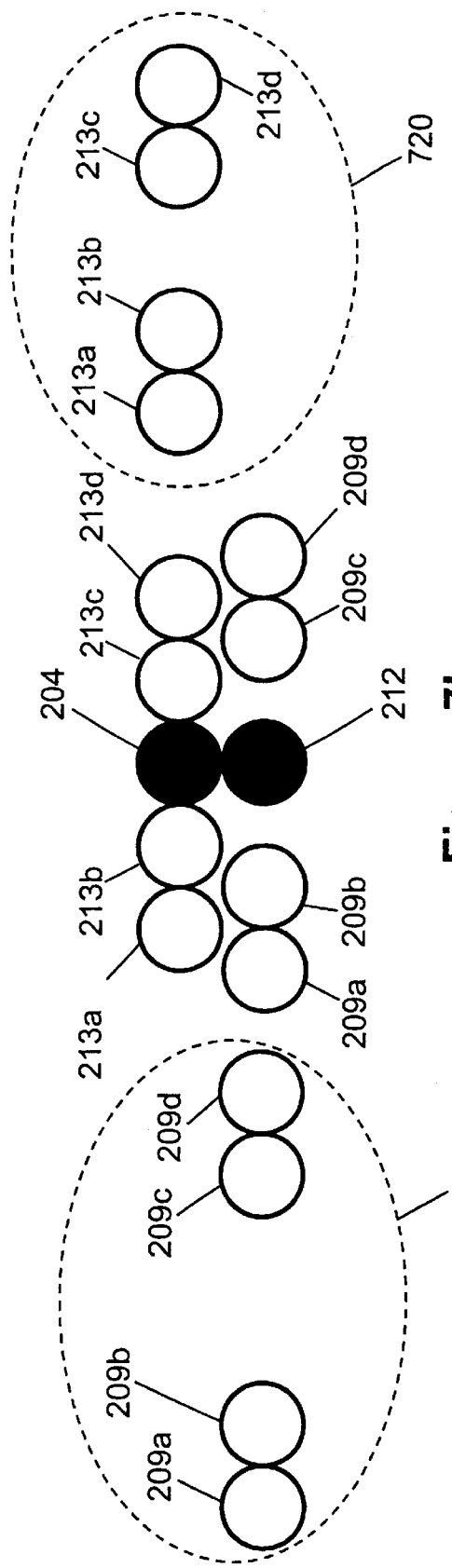

FIGS. 7a and 7b illustrate end views of input and output fibers in two possible configurations of a fiber array of the channel separator of the WDM in accordance with the present invention. FIGS. 7a and 7b respectively illustrate a single planar array and a double planar array configuration of the fibers comprising fiber array 205. In both FIG. 7a and FIG. 7b, fiber 204 is an input/output fiber that carries, either as input or output, a wavelength division multiplexed composite optical signal and fibers 209a–209e are a plurality of output/input fibers wherein each such fiber carries, either as output or input, a single signal comprising an individual wavelength. In FIG. 7b, fiber 212 is a second input/output fiber corresponding to fiber 204 and fibers 213a–213d are a second plurality of output/input fibers corresponding to the set 209a–209d.

Figure 1A:
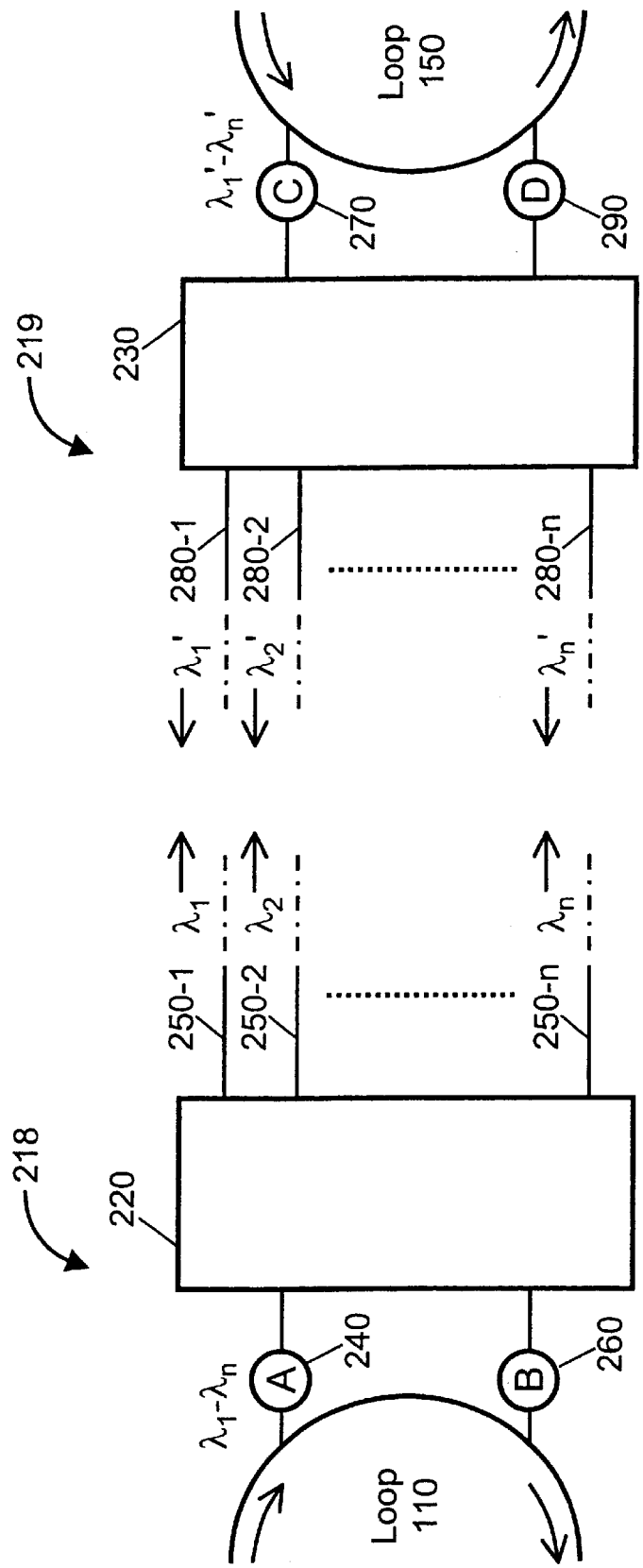
FIG. 1a and FIG. 1b illustrate two configurations of conventional add/drop systems utilizing wavelength division multiplexers (WDM).
Figure 1B:
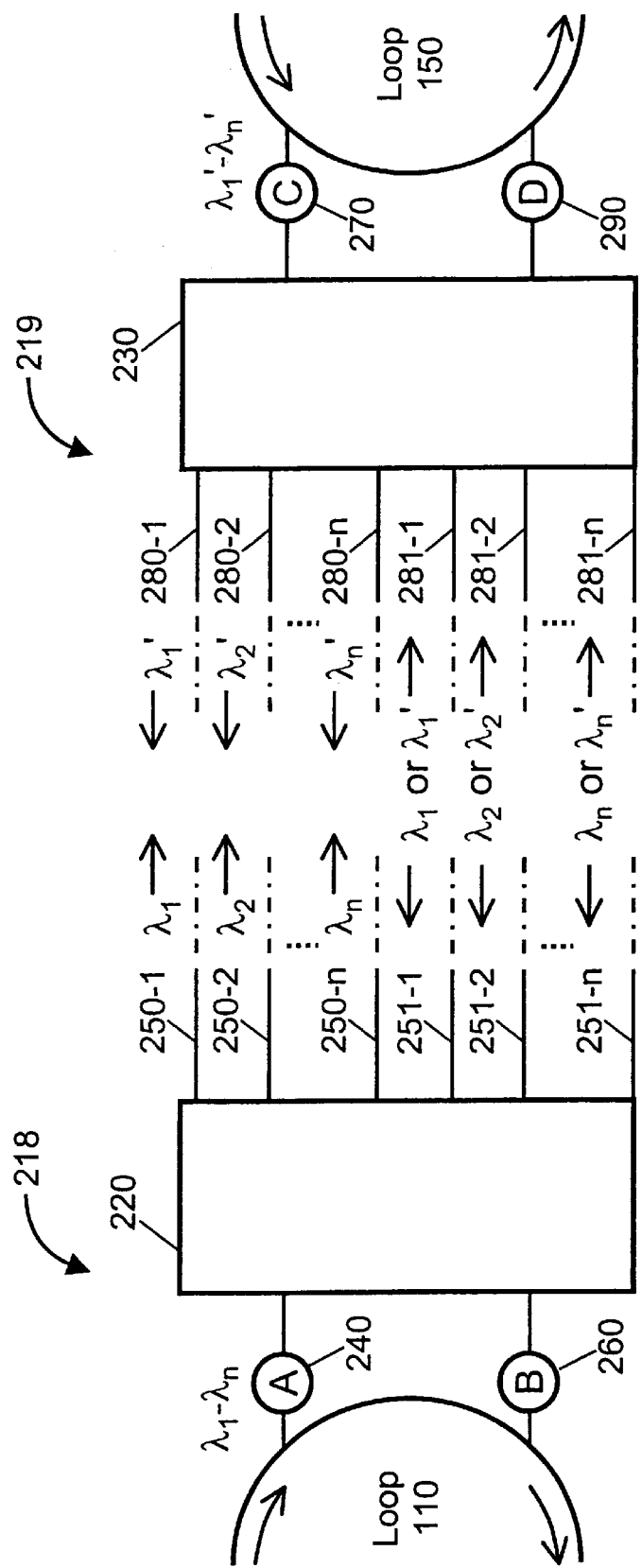
Figure 1C:
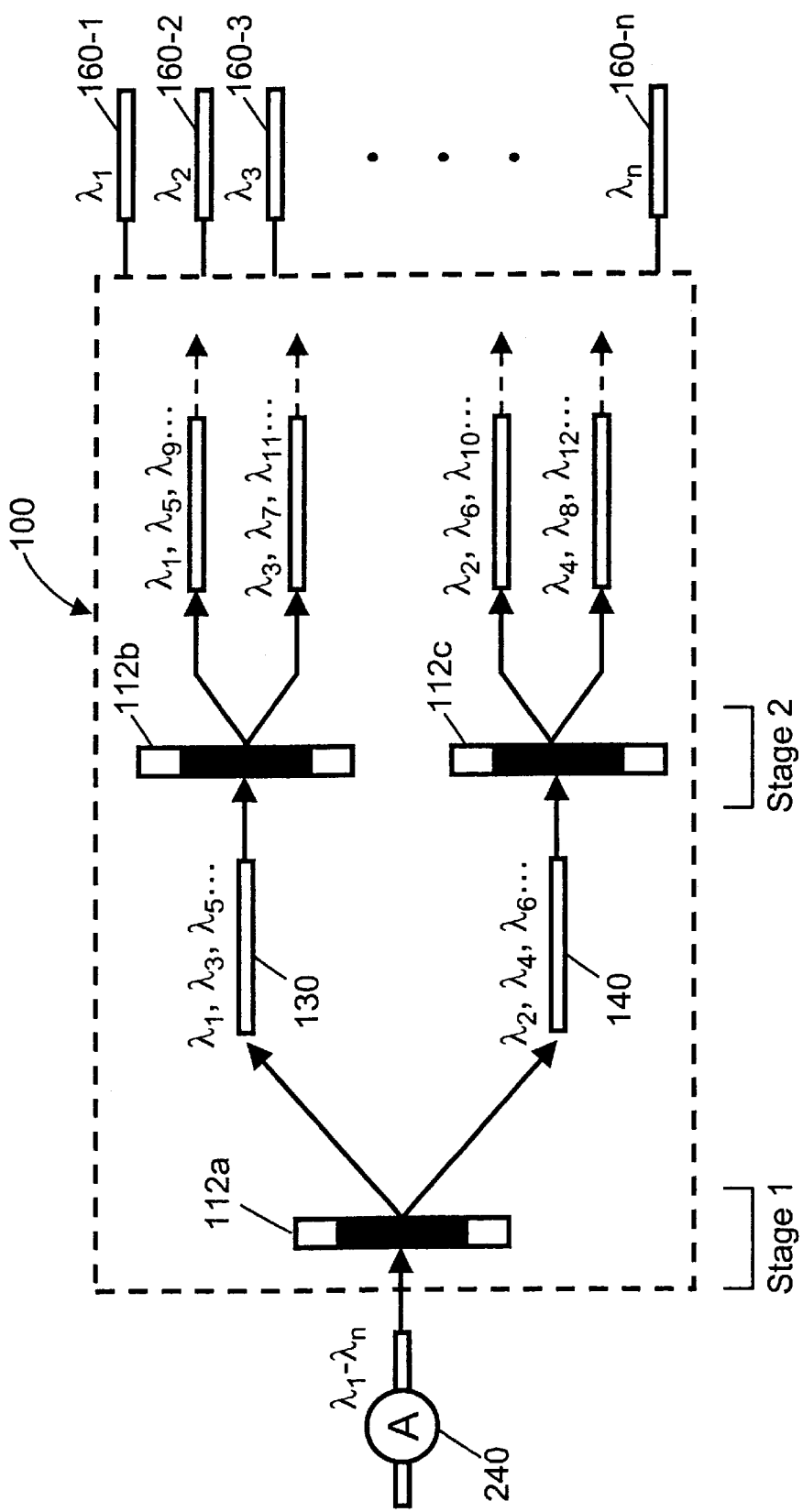
FIG. 1c is a schematic representation of a wavelength division multiplexer employing a Multi-Stage Parallel Cascade configuration of channel separators.
Figure 2A:
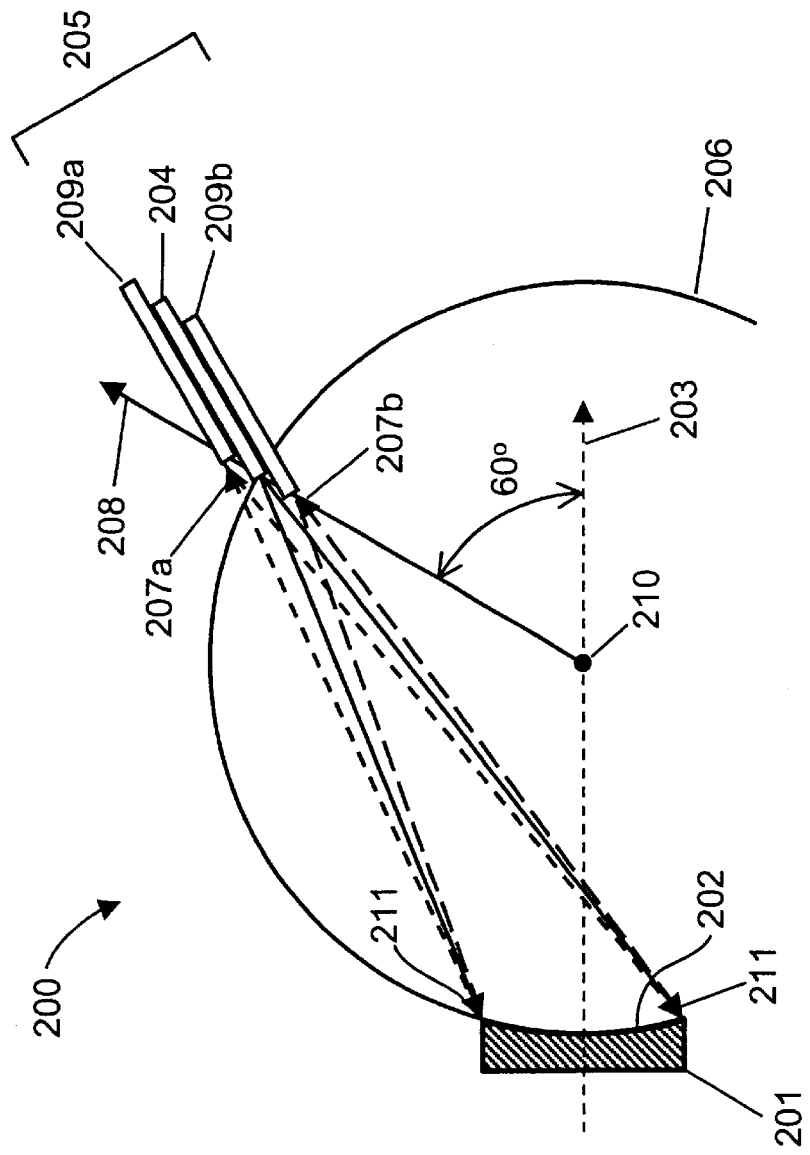
FIGS. 2a and 2b illustrate a top and a side view, respectively, of a prior-art grating-based channel separator employing a concave holographic grating in stationary anastigmatic Littrow configuration.

In the single planar array embodiment shown in FIG. 7a, the fibers 209a–209e are all disposed within a plane that is at an angle φ (≧0) with respect to the dispersion plane of grating 302 and the fiber 204 is to the opposite side of the dispersion plane and is disposed at an angle of −φ (≦0) with respect to the dispersion plane. In the double planar array embodiment shown in FIG. 7b, the fibers 204, 213a–213d are all disposed within a first plane, and the fibers 212, 209a–209d are all disposed within a second plane wherein the second and first planes are disposed at an angle φ (≧0) and at an angle −φ(≦0) to the grating dispersion plane, respectively. The centers of the end faces of all fibers are disposed within the lane 208 (FIG. 2a) in either the single or double planar array configuration. The spacings between fibers within either the first or second plane need not be regular, and the inter-fiber spacings within the first plane need not be the same as those within the second plane. The fibers 209a–209d comprise a first set 710 of output/input fibers and the fibers 213a–213d comprise a second set 720 of output/input fibers.

In a de-multiplexer operation, a wavelength division multiplexed composite optical signal is input to the channel separator through input/output fiber 204 or 212, the composite optical signal is separated into its individual component signals by the grating 302, the separated signals are spatially dispersed by the grating 302 according to their respective wavelengths, and each individual signal is directed and focused onto a different respective fiber of the plurality of output/input fibers 209a, 209b, 209c . . . or 213a, 213b, 213c . . . , respectively. The individual signals are then output from the channel separator along respective individual output/input fibers of the set 209a, 209b, 209c, . . . or 213a, 213b, 213c . . . , respectively. As a multiplexer, individual signals are input to the channel separator from respective individual fibers of the plurality of output/input fibers 209a, 209b, 209c . . . or 213a, 213b, 213c . . . , the signals are diffracted by the grating 302 along a single direction so as to be combined into a single composite optical signal and the composite optical signal is focused onto the end of the input/output fiber 204 or 212, respectively, so as to be output from the channel separator therein.

Figure 2B:
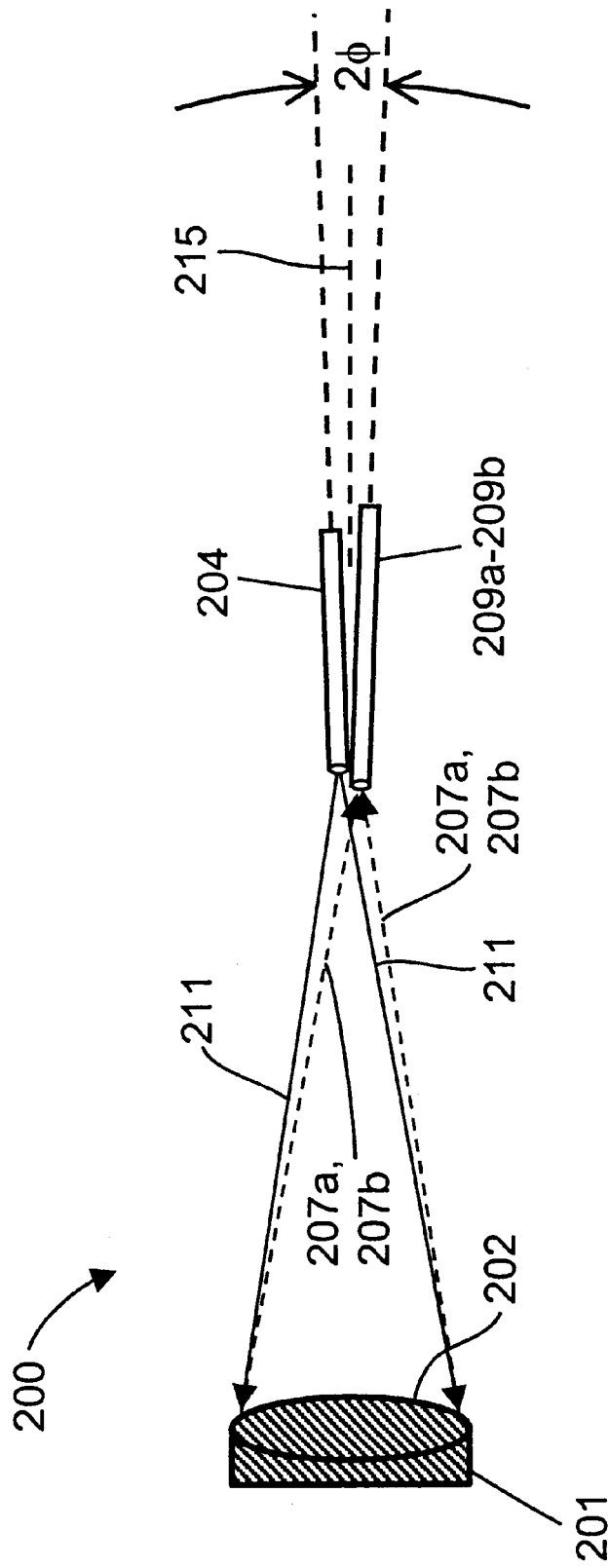
Figure 7C:
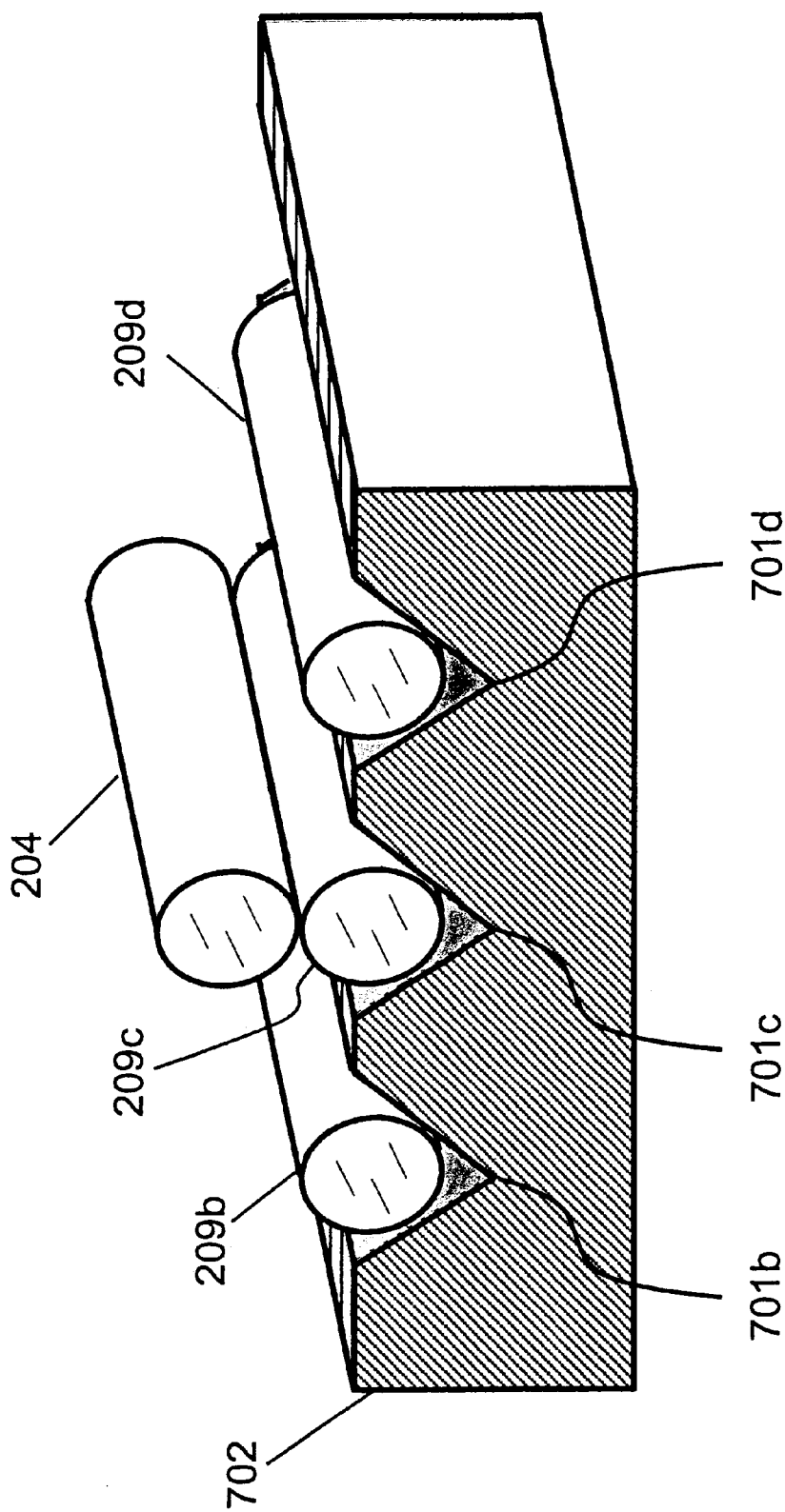
FIG. 7c illustrates the precise alignment of fibers in the single planar array configuration in the channel separator of the WDM in accordance with the present invention.

FIG. 7c illustrates the precise alignment of fibers in the single planar array configuration of the channel separator of the WDM in accordance with the present invention. The fibers 209b–209d are disposed within a set of V-grooves 701b–701d, pre-cut or pre-formed within a face of the fiber alignment block 702, preferably using well-known photolithographic masking and etching processes. The fiber 204 is disposed out of the plane of the set of fibers 209b–209d and is held securely in place by an opposing pressure plate, by a set of adjacent non-light transmitting fibers, or by some other securing mechanism (not shown). The long axis of fiber 204, in general, makes an angle of 2φ with respect to that of the fiber with which it is in contact (FIG. 2b), where the situation in which 2φ=0 is also permitted (FIG. 7c). When the double planar array configuration (FIG. 7b) is utilized, additional fibers 213a–213c are disposed to either side of fiber 204 in substantially the same plane as fiber 204.

Figure 7D:
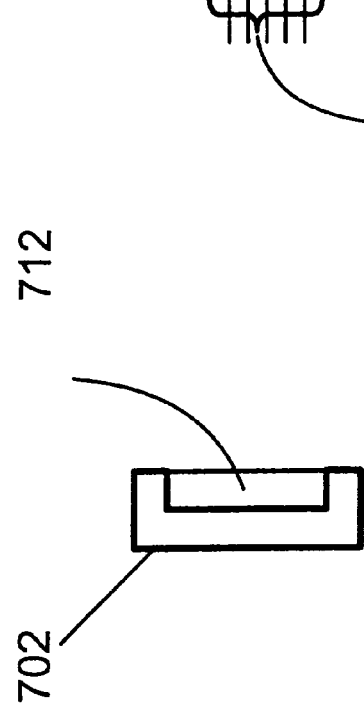
FIG. 7d illustrates an end view and a side view of the fiber alignment block of the channel separator of the WDM in accordance with the present invention.
Figure 7D:
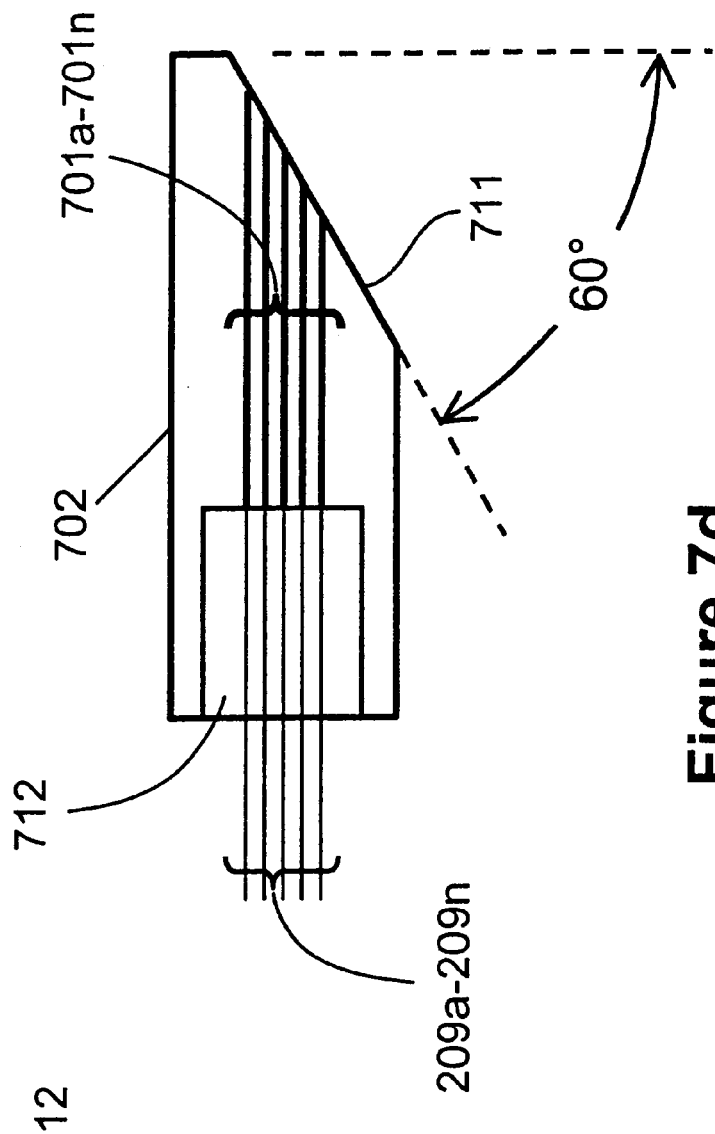

FIG. 7d illustrates an end view and a side view of the fiber alignment block 702 of the channel separator of the WDM in accordance with the present invention. Each one of the set 209a–209n of fibers is disposed within a respective one of the V-grooves 701a–701n. The fibers are securely held in place within the V-grooves by epoxy or other adhesive and/or by a pressure plate (not shown) such that at least one plane of fibers is parallel to the top face of the fiber alignment block 702. One end face 711 of the fiber alignment block 702 is cut at a 60° angle and the end faces of the fibers of set 209a–209n are disposed in alignment with the face 711. In operation, the end face 711 faces the grating block 300. A recess 712 is disposed at the opposite end of the fiber alignment block 702 from face 711 to provide strain relief for the fibers.

Figure 7E:
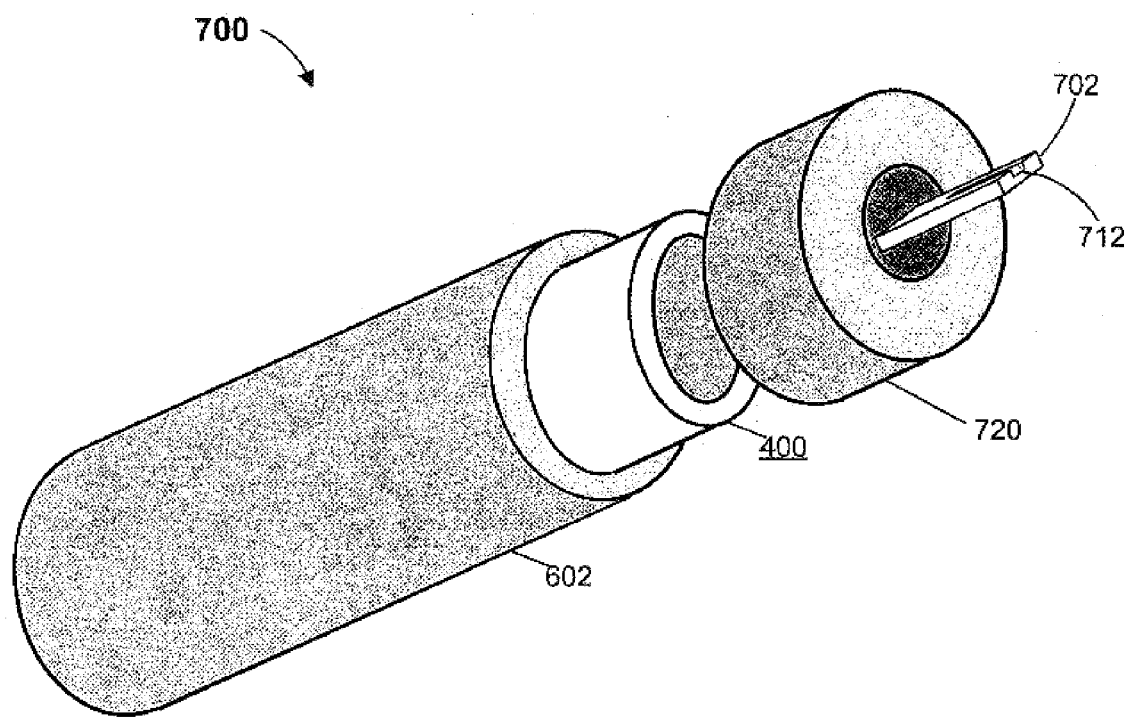
FIG. 7e illustrates a perspective view of the assembled channel separator of the WDM in accordance with the present invention.

FIG. 7e illustrates a perspective view of the assembled channel separator of the WDM in accordance with the present invention. The fiber alignment block 702 is positioned within an end cap 720 such that the angled face 711 of the block 702 and the ends of the fibers of set 205 face towards the grating block 300. The end cap 720 provides freedom for lateral and angular adjustment of the disposition of the plane of the top face of the fiber alignment block 702. The fiber alignment block 702 is secured to the end cap 720 by epoxy, solder, or other securing mechanism or adhesive, and the end-cap 720 is secured to the sleeve 602. The final package is thereby hermetically sealed to protect the internal parts from environmental stresses or changes.

Figure 8:
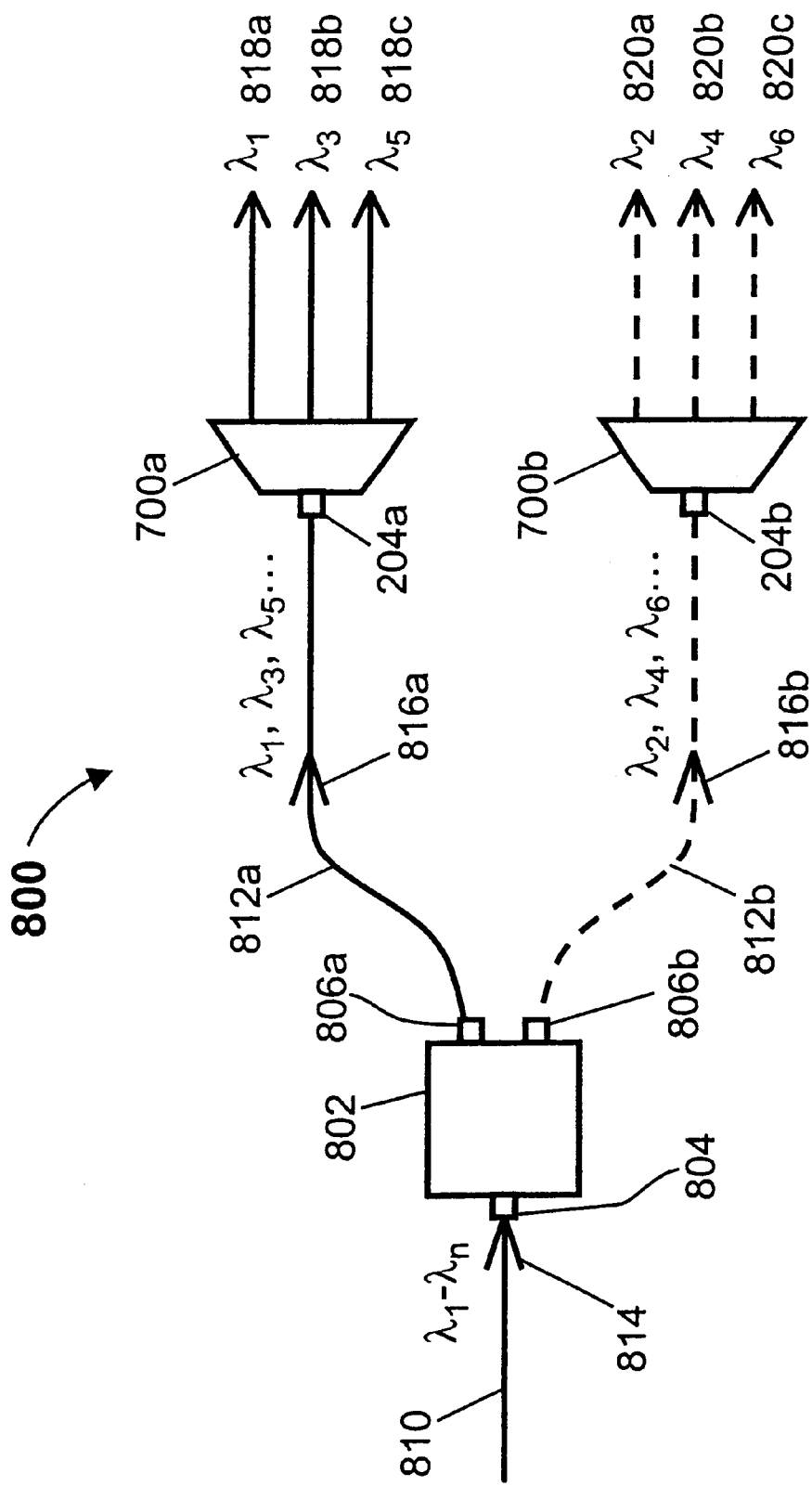
FIG. 8 illustrates a first preferred embodiment of a WDM utilizing the grating-based channel separator in accordance with the present invention.

FIG. 8 illustrates a first preferred embodiment of a WDM which utilizes the grating-based channel separator in accordance with the present invention. The WDM 800 comprises an interleaved channel separator 802 optically coupled to each of two grating-based channel separators 700a–700b as described in FIGS. 3–7e. In the preferred embodiment, the interleaved channel separator 802 is of the type disclosed in U.S. patent application Ser. No. 09/129,635, described in the "Background of the Invention" section of this specification. In FIG. 8, a composite optical signal 814 comprised of individual signals $\lambda_1$–$\lambda_n$ is input from fiber 810 to an input port 804 of the interleaved channel separator 812. The interleaved channel separator 802 separates the composite optical signal 814 into a first set 816a of channels comprising the set of odd channels $\lambda_1$, $\lambda_3$, $\lambda_5$, . . . and a second set 816b of channels comprising the even channels $\lambda_2$, $\lambda_4$, $\lambda_6$, . . . of the original signal. The channels 816a and 816b are output from ports 806a and 806b, respectively, of interleaved channel separator 802 to optical coupling 812a and optical coupling 812b, respectively. In a preferred embodiment, each of the optical couplings 812a–812b comprise optical fibers, although other forms of optical coupling—such as, for instance, planar waveguides or free-space optical couplings—are possible. The first 816a and second 816b channel sets are then input to grating-based channel separators 700a and 700b, respectively. Fiber 204a is an input/output fiber utilized as an input port to channel separator 700a and fiber 204b is an input/output fiber utilized as an input port to channel separator 700b. Each of the channel separators 700a–700b separates the channels of the respective input composite optical signal 816a–816b such that each channel is output from a separate fiber or port. The fiber configuration of either or both of the channel separators 700a–700b may be of either the single planar array (FIG. 7a) or the double planar array (FIG. 7b) type. However, if the fiber configuration is of the double planar array type, one set of output/input fibers and one input/output fiber remain unused. The channel separator 700a separates the set 816a of odd channels so that each individual channel is output along a separate path 818a, 818b, 818c, etc. and the channel separator 700b simultaneously separates the set 816b of even channels so that each individual channel is output along a separate path 820a, 820b, 820c, etc. Each such path corresponds to or is optically coupled to one of the output/input fibers in the fiber array 205.

It is to be kept in mind that, since each of the individual grating-based channel separators 700a–700b and the interleaved channel separator 802 can be used in the reverse sense as a multiplexer, the WDM 800 can also be used as a multiplexer simply by reversing the directions of all signal paths. Thus, in operation as a multiplexer, individual odd channels $\lambda_1$, $\lambda_3$, $\lambda_5$, etc. that are input to channel separator 700a via paths 818a, 818b, 818c, etc, respectively, are combined into a set of wavelength-division multiplexed odd channels 816a. Also, individual even channels $\lambda_2$, $\lambda_4$, $\lambda_6$, etc. that are input to channel separator 700b via paths 820a, 820b, 820c, etc, respectively, are combined into a set of wavelength-division multiplexed even channels 816b. These odd channels 816a and even channels 816b are then input to interleaved channel separator 802 through ports 806a and 806b, respectively, and are combined within interleaved channel separator 802 into a single signal 810 which is output from port 804.

Still further, since the paths of odd channels and of even channels are independent of one another in the WDM 800, one set of channels (e.g., the set of odd channels 816a) can propagate in a first direction (e.g., from logical left to right in FIG. 8) whilst the other set of channels (e.g., the set of even channels 816b) simultaneously propagates in the logical opposite direction (e.g., from logical right to left in FIG. 8). Thus, in the WDM 800, one of the grating-based channel separators 700a–700b may be used as a multiplexer whilst the other is simultaneously utilized as a de-multiplexer. This situation corresponds to interleaved bi-directional optical communications in the fiber 810, wherein a first set of channels propagates in a first direction, a second set of channels propagates in a second direction opposite to the first direction, and the first and second sets of channels are interleaved with one another.

Figure 9:
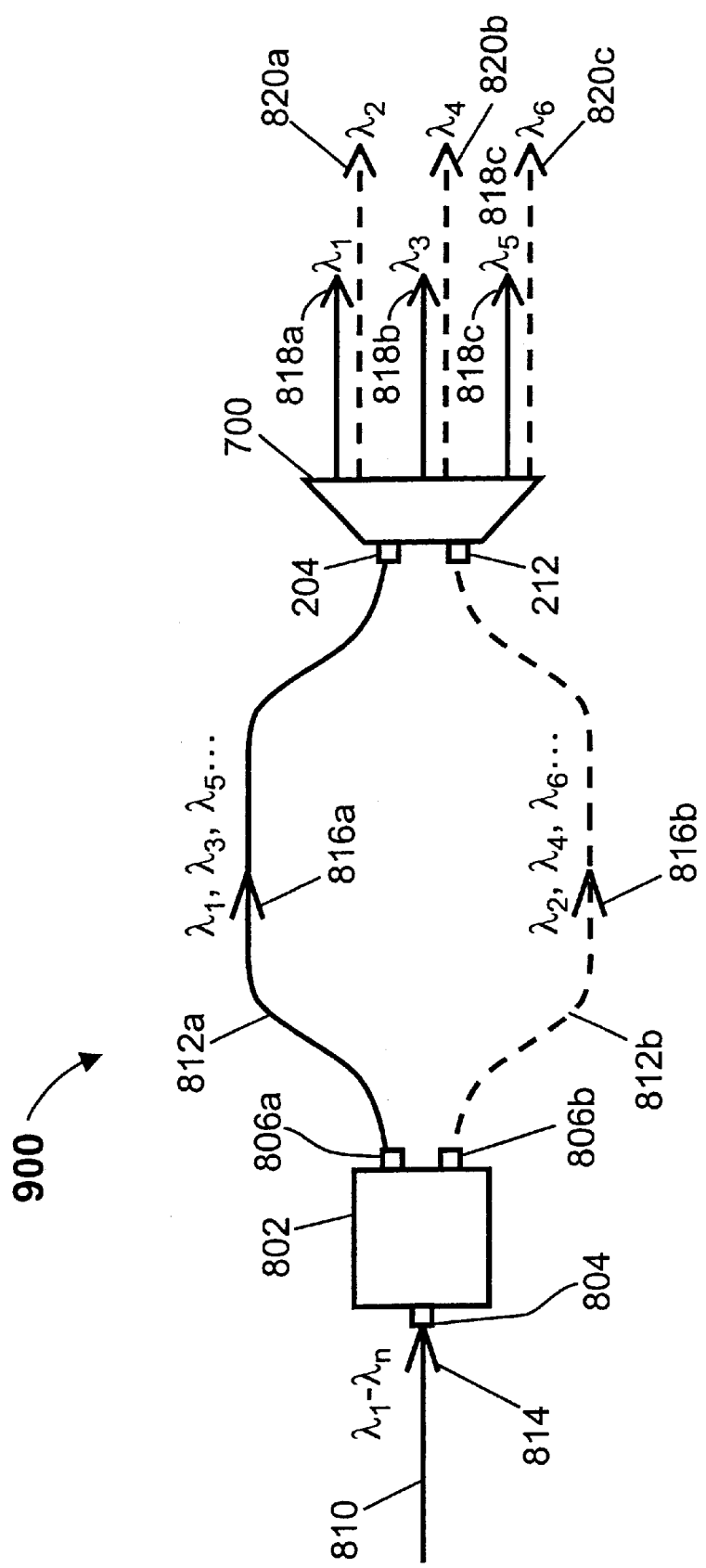
FIG. 9 illustrates a second preferred embodiment of a WDM utilizing the grating-based channel separator in accordance with the present invention.

FIG. 9 illustrates a second preferred embodiment of a WDM which utilizes the grating-based channel separator in accordance with the present invention. The WDM 900 comprises an interleaved channel separator 802 optically coupled to a single grating-based channel separator 700, as described in FIGS. 3–7e. In FIG. 9, the paths of signals input to and output from the interleaved channel separator 802 are identical to those illustrated for the WDM 800 shown in FIG. 8. Therefore, components of WDM 900 that are similar to those of WDM 800 are numbered similarly in both FIG. 8 and FIG. 9.

In the WDM 900, the input and output fibers comprising the single grating-based channel separator 700 are disposed in the double planar array configuration illustrated in FIG. 7b. Both the set of odd channels 816a and the set of even channels 816b are input to channel separator 700 through input/output fiber 204 and input/output fiber 212, respectively. The channel separator 700 then simultaneously and independently separates the odd channels from one another and the even channels from one another such that the signal of each odd channel is directed to a unique one of the set of output paths 818a, 818b, 818c, . . . and such that the signal of each even channel is directed to a unique one of the set of output paths 820a, 820b, 820c, . . . As mentioned previously in regard to the WDM 800, the set 816a of odd channels and the set 816b of even channels may proceed logically from left to right or from right to left through the WDM 900 completely independently of one another.

Figure 10:
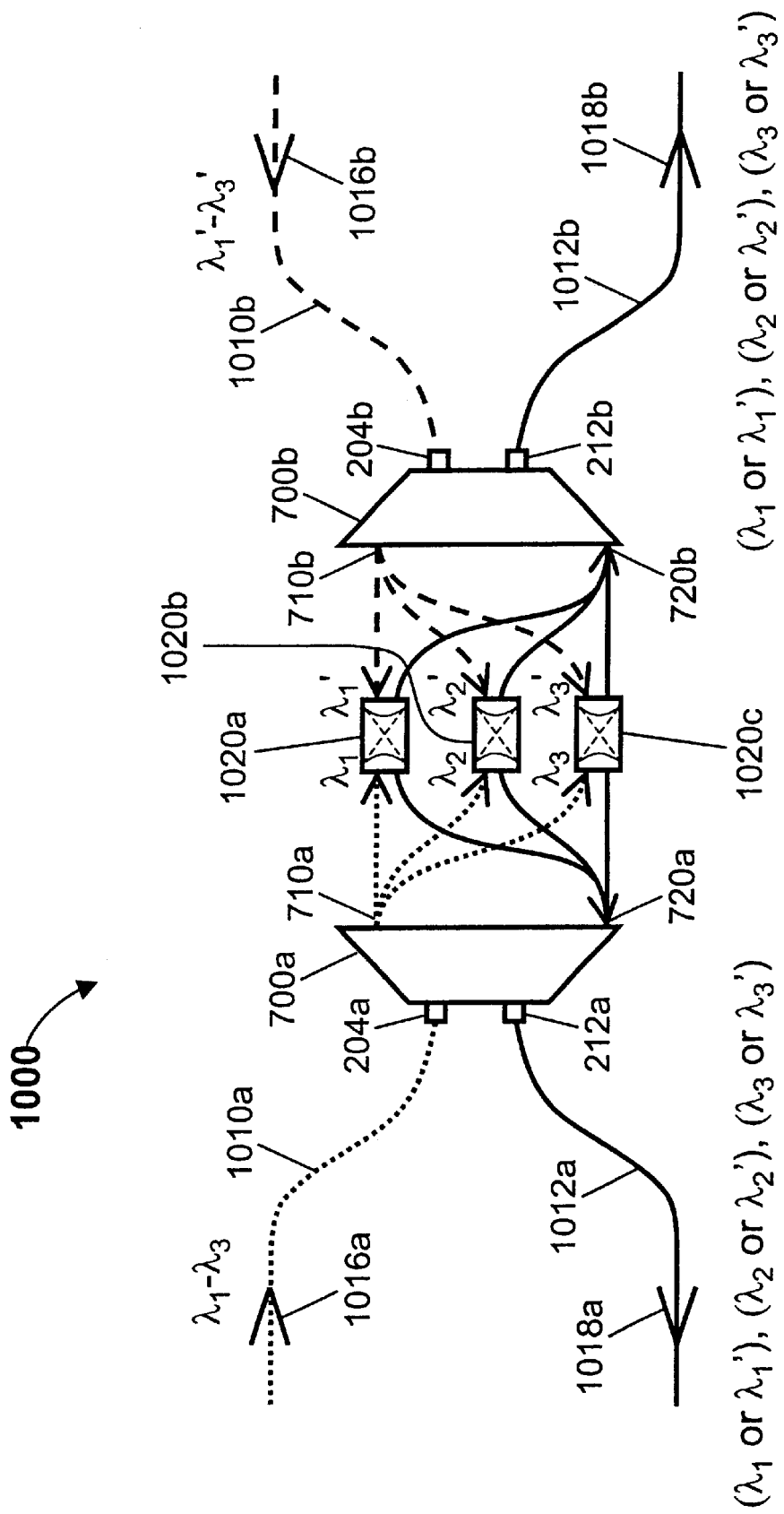
FIG. 10 illustrates an optical add/drop multiplexer utilizing the grating-based channel separator in accordance with the present invention.

FIG. 10 illustrates an optical add/drop multiplexer utilizing the grating-based channel separator in accordance with the present invention. Each of the two channel separators 700a–700b utilizes a fiber array 205 of the double planar array type illustrated in FIG. 7b. The first channel separator 700a receives a first composite optical signal 1016a through its input/output fiber 204a from an optical communications line 1010a. Likewise, the second channel separator 700b receives a second composite optical signal 1016b through its input/output fiber 204b from an optical communications line 1010b. Each one of a set of 2×2 optical switches 1020a–1020c is optically coupled to one fiber of the first set 710a of output/input fibers emanating from the first channel separator 700a and to one fiber of the first set 710b of output/input fibers emanating from the second channel separator 700b. Furthermore, each of the set of 2×2 optical switches 1020a–1020c is optically coupled to one fiber of the second set 720a of output/input fibers emanating from the first channel separator 700a and to one fiber of the second set 720b of output/input fibers emanating from the second channel separator 700b.

As illustrated in FIG. 10, the first channel separator 700a (second channel separator 700b) separates the channels of first composite optical signal 1016a (second composite optical signal 1016b) from one another according to their respective wavelengths and outputs each of the separated signals to a unique individual output fiber of the set 710a of output/input fibers (set 710b of output/input fibers). Since each fiber of the set 710a and of the set 710b of output/input fibers carries a unique signal and wavelength, each one of the 2×2 optical switches 1020a–1020c receives one signal $\lambda_i$ output from first channel separator 700a and one signal $\lambda_i'$ output from second channel separator 700b. The two signals received by each 2×2 optical switch are of the same wavelength. Each one of the 2×2 optical switches has two operational modes—a first (bar) mode in which the signal $\lambda_i$ is directed to a fiber of the set of fibers 720a and the signal $\lambda_i'$ is directed to a fiber of the set of fibers 720b and a second (cross) mode in which the signal $\lambda_i$ is directed to a fiber of the set of fibers 720b and the signal $\lambda_i'$ is directed to a fiber of the set of fibers 720a. In the bar mode, a signal originally input to first channel separator 700a is returned to first channel separator 700a and a signal originally input to second channel separator 700b is returned to second channel separator 700b. In the cross mode, a signal originally input to first channel separator 700a is directed to second channel separator 700b and a signal originally input to second channel separator 700b is directed to first channel separator 700a. Each 2×2 optical switch 1020a, 1020b, 1020c, . . . operates independently of every other one of the optical switches under external control (not shown).

Signals passing through each of the 2×2 optical switches 1020a, 1020b, 1020c, . . . are directed to one of the fibers of the set of fibers 720a and/or one of the fibers of the set 720b. The signal carried by each such fiber may originate from either the first composite optical signal 1016a or the second composite optical signal 1016b depending upon the state of the switch through which it has passed. Signals passing through the fibers 720a are input therefrom to the first channel separator 700a in which they are combined into a third composite optical signal 1018a which is output to optical communications line 1012a from fiber 212a. Likewise, signals passing through the fibers 720b are input therefrom to the second channel separator 700b in which they are combined into a fourth composite optical signal 1018b which is output to optical communications line 1018b through fiber 1012b. In this fashion the optical add/drop 1000 operates as an optical add/drop multiplexer.

An improved wavelength division multiplexer (WDM) which utilizes a grating-based channel separator has been disclosed. A preferred embodiment of the WDM comprises an interleaved channel separator and one more grating-based channel separators. Each grating-based channel separator comprises a packaging comprising a concave holographic reflection grating with an alignment surface, a first hollow sleeve or cylinder with a three point mount for contacting the concave holographic reflecting grating and alignment surface, a pin or plate to align the alignment surfaces of the grating and the first hollow sleeve or cylinder, and a second hollow sleeve or cylinder with a spring-loaded holding mechanism in contact with the back side of the grating substrate. This grating-based channel separator affords a quick, easy, precise and reproducible positioning and alignment of the grating block. Thus, the WDM is minimized in size while also reproducibly assembled with perfect alignment in a minimal amount of time.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A wavelength division multiplexer (WDM), comprising:
    an interleaved channel separator; and
    at least one channel separator optically coupled to the interleaved channel separator, wherein the at least one channel separator comprises a grating, wherein the grating comprises a substrate plate, the substrate plate comprising an alignment surface at an oblique angle to the grating surface.

2. The WDM of claim 1, wherein the interleaved channel separator comprises:
    at least one of a first optic fiber;
    at least one of a first lens optically coupled to the first optic fiber;
    at least two of a second optic fiber optically coupled to the first lens;
    at least one of a second lens optically coupled to the second optic fibers which are not optically coupled to the first lens;
    a polarization beam splitter optically coupled to the lenses; and
    at least two nonlinear interferometers optically coupled to the polarization beam splitter.

3. The WDM of claim 1, wherein the at least one channel separator comprises:
    a first channel separator optically coupled to a first port of the interleaved channel separator; and
    a second channel separator optically coupled to a second port of the interleaved channel separator.

4. The WDM of claim 1, wherein the grating further comprises:
    a concave holographic grating surface.

5. The WDM of claim 4, wherein the substrate plate comprises a low-thermal-expansion substrate.

6. The WDM of claim 4, wherein the grating surface diffracts light such that the grating surface operates in a Littrow configuration.

7. The WDM of claim 4, wherein the grating surface comprises a reflective concave surface in a geometric form of a spherical cap.

8. The WDM of claim 7, wherein a grating axis of the grating surface is substantially perpendicular to a chord to the grating surface at a center of the spherical cap.

9. The WDM of claim 4, wherein the substrate plate further comprises:
    a back surface opposite to the grating surface, wherein the back surface is substantially flat and substantially perpendicular to a grating axis of the grating surface.

10. The WDM of claim 1, wherein the at least one channel separator further comprises:
    an alignment surface of the grating;
    a first sleeve comprising a mount, the mount capable of contacting the grating; and
    an alignment plate coupled to an outer surface of the first sleeve, wherein the alignment plate is capable of contacting the alignment surface of the grating.

11. The WDM of claim 10, wherein the first sleeve comprises a low-thermal-expansion material.

12. The WDM of claim 10, wherein the first sleeve is cylindrical in cross-section.

13. The WDM of claim 10, wherein the first sleeve comprises:
    a slanted surface at an end of the first sleeve;
    the mount coupled to the slanted surface; and
    a slot on the outer surface of the first sleeve coupled to the alignment plate.

14. The WDM of claim 13, wherein the slanted surface is disposed at an angle such that an axis of the first sleeve is substantially parallel to a Littrow axis of the grating.

15. The WDM of claim 13, wherein the mount comprises a plurality of mounting pins.

16. The WDM of claim 10, wherein the at least one channel separator further comprises:
    a second sleeve, wherein at least a portion of the grating, the first sleeve, and the alignment plate are capable of residing within the second sleeve.

17. The WDM of claim 16, wherein the second sleeve comprises:
    an open end;
    a sealed end opposite to the open end; and
    a holding mechanism coupled to the sealed end and residing within the second sleeve, wherein the holding mechanism is capable of applying force to the grating to place the grating into proper alignment with the mount and the alignment plate.

18. The WDM of claim 17, wherein the holding mechanism is spring-loaded.

19. The WDM of claim 16, further comprising:
    an end cap coupled to an open end of the second sleeve; and
    a fiber alignment block coupled to the end cap and optically coupled to the grating.

20. The WDM of claim 19, wherein the fiber alignment block comprises:
    a plurality of fibers;
    a plurality of grooves for holding the plurality of fibers;
    an angled end face facing the grating; and
    a recess at an end opposite to the angled end face.

21. A method for de-multiplexing a composite optical signal, comprising the steps of:
    (a) separating the composite optical signal into a first set of channels and a second set of channels, wherein the first and second sets of channels are interleaved;
    (b) delivering the first set of channels to a first port of at least one channel separator and the second set of channels to a second port of the at least one channel separator, wherein the at least one channel separator comprises a grating, wherein the grating comprises a substrate plate, the substrate plate comprising an alignment surface at an oblique angle to the grating surface; and (c) dispersing the first and second sets of channels into individual channels by the at least one channel separator.

22. A method for multiplexing a composite optical signal, comprising the steps of:
   (a) delivering a plurality of individual channels to at least one channel separator, wherein the at least one channel separator comprises a grating, wherein the grating comprises a substrate plate, the substrate plate comprising an alignment surface at an oblique angle to the grating surface;
   (b) combining the plurality of individual channels into a first set of channels and a second set of channels by the at least one channel separator, wherein the first and second sets of channels are interleaved; and
   (c) combining the first and second sets of channels into the composite optical signal.

23. A WDM, comprising:
   an interleaved channel separator;
   a first channel separator optically coupled to a first port of the interleaved channel separator; and
   a second channel separator optically coupled to a second port of the interleaved channel separator, wherein the first and second channel separator each comprises a grating, wherein the grating comprises a substrate plate, the substrate plate comprising an alignment surface at an oblique angle to the grating surface.

24. A system, comprising:
   a first and a second optical communications lines; and
   an add/drop multiplexer, comprising:
      a first channel separator, comprising a first set of ports optically coupled to the first optical communications line and a second set of ports,
      a second channel separator, comprising a third set of ports optically coupled to the second optical communications line and a fourth set of ports, wherein the first and second channel separators each comprises:
         a grating comprising an alignment surface,
         a sleeve comprising a mount, the mount capable of contacting the grating, and
         an alignment plate coupled to an outer surface of the sleeve, wherein the alignment plate is capable of contacting the alignment surface of the grating; and
   at least one switch optically coupled to the second and fourth sets of ports.

* * * * *